(12) United States Patent
Li et al.

(10) Patent No.: US 10,826,131 B2
(45) Date of Patent: Nov. 3, 2020

(54) ELECTRODE ASSEMBLY AND BATTERY

(71) Applicant: Ningde Amperex Technology Limited, Ningde, Fujian (CN)

(72) Inventors: Baozhang Li, Fujian (CN); Weimin Jiao, Fujian (CN); Zhiwen Xiao, Fujian (CN); Junhui Hou, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 16/158,485

(22) Filed: Oct. 12, 2018

(65) Prior Publication Data
US 2020/0036051 A1    Jan. 30, 2020

(30) Foreign Application Priority Data
Jul. 27, 2018   (CN) .................... 2018 2 1206337 U (51) Int. Cl.
*H01M 10/42* (2006.01)
*H01M 10/0525* (2010.01)
*H01M 4/13* (2010.01)

(52) U.S. Cl.
CPC ......... *H01M 10/4235* (2013.01); *H01M 4/13* (2013.01); *H01M 10/0525* (2013.01)

(58) Field of Classification Search
CPC . H01M 10/4235; H01M 4/13; H01M 10/0525
See application file for complete search history.

(56) References Cited

U.S. PATENT DOCUMENTS

2006/0222934 A1* 10/2006 Min ..................... H01M 2/18
429/142

* cited by examiner

*Primary Examiner* — Osei K Amponsah (57) ABSTRACT

The embodiments of present application provides an electrode assembly and a battery comprising a first current collector including a first end portion, a first bending segment, a first starting segment therebetween; a second current collector including a second end portion, a second bending segment, a second starting segment therebetween; the first and second bending segments are regions where the first and second current collectors are bent for the first time respectively, and a first and second electrode tabs are respectively arranged on the first and second starting segments, a distance between the first electrode tab and the first end portion is smaller than a distance between the first electrode tab and the first bending segment, a distance between the second electrode tab and the second end portion is greater than a distance between the second electrode tab and the second bending segment.

20 Claims, 10 Drawing Sheets

ELECTRODE ASSEMBLY AND BATTERY

CROSS-REFERENCE TO RELATED APPLICATIONS

This application claims priority of Chinese patent application No. 201821206337.8 filed on Jul. 27, 2018, the contents of which are incorporated herein by reference in their entirety.

FIELD OF THE INVENTION

The embodiments of the present application relate to the field of battery, and in particular, to an electrode assembly and a battery.

BACKGROUND OF THE INVENTION

In the battery field, Impact & Nail performance is an important indicator of the safety performance of batteries. As the energy density of lithium batteries continues to increase, it is more and more difficult for impacting and nailing. The internal protection structure is one of the important means to improve the performance of both.

The traditional internal protection structure mainly extends the length of the light copper and light aluminum in the head of the anode and cathode electrode plates. In order to ensure the improvement effect on the impact and nail performance, it is usually necessary to make the length of the light copper and light aluminum of the head of electrode plate to the length of a half-turn bare electrode assembly or a ring of bare electrode assembly. Since the thickness of the light copper and light aluminum is very thin (usually ≤12 um), the blank foil may wrinkle during winding, which affects the reliability of the winding process.

Therefore, it is necessary to optimize the traditional internal protection structure to improve the reliability of the winding process.

SUMMARY OF THE INVENTION

The purpose of the present application is to provide an electrode assembly and a battery for at least achieving enhanced winding implementability of the internal protection structure, effectively improve the winding process reliability, and not to affect the performance of impact and nail of the internal protection structure.

According to embodiments of the present application, a electrode assembly is provided comprising a first current collector including a first end portion, a first bending segment, and a first starting segment therebetween; a second current collector including a second end portion, a second bending segment, and a second starting segment therebetween; the first bending segment and the second bending segment are regions where the first current collector and the second current collector are bent for the first time respectively, and a first electrode tab and a second electrode tab are respectively arranged on the first starting segment and the second starting segment, wherein a distance between the first electrode tab and the first end portion is smaller than a distance between the first electrode tab and the first bending segment, and a distance between the second electrode tab and the second end portion is greater than a distance between the second electrode tab and the second bending segment.

According to embodiments of the present application, a first protective layer and a second protective layer are respectively arranged on the first electrode tab and the second electrode tab; wherein at least one of the first protective layer and the second protective layer has a thickness between 20 microns and 40 microns.

According to embodiments of the present application, the first current collector includes a first uncoated foil region, a surface of the first uncoated foil region is not provided with an active material, and the first starting segment is located on the first uncoated foil region; wherein the surface of the first uncoated foil region is provided with a third protective layer, and in a thickness direction of the first electrode tab, the third protective layer is not overlapped with the first protective layer.

According to embodiments of the present application, the first uncoated foil segment further includes the first bending segment and the first straight segment, and the first bending segment is located between the first straight segment and the first starting segment; wherein in a thickness direction of the first electrode tab, the first starting segment is located between the first straight segment and the second starting segment, and the third protective layer is located on the first straight segment.

According to embodiments of the present application, the third protective layer is arranged on the first straight segment, the first bending segment and the first starting segment.

According to embodiments of the present application, in a thickness direction of the first electrode tab, the third protective layer is overlapped with the second protective layer.

According to embodiments of the present application, the second current collector further includes the second straight segment, and the second bending segment is located between the second straight segment and the second starting segment; wherein in a thickness direction of the second electrode tab, the first starting segment is located between the second straight segment and the second starting segment, and the second protective layer is located on the second starting segment, the second bending segment and the second straight segment.

According to embodiments of the present application, the second current collector further includes the second straight segment, and the second bending segment is located between the second straight segment and the second starting segment; wherein in a thickness direction of the second electrode tab, the first starting segment is located between the second straight segment and the second starting segment, and a fourth protective layer is further arranged on the second bending segment and the second straight segment.

According to embodiments of the present application, the second protective layer is connected with the fourth protective layer.

According to embodiments of the present application, the third protective layer is arranged on the first straight segment, and the first starting segment is provided with the fourth protective layer; wherein in a thickness direction of the first electrode tab, the second protective layer, the third protective layer, and the fourth protective layer are overlapped with each other.

According to embodiments of the present application, in a thickness direction of the second electrode tab, the third protective layer is overlapped with the second protective layer.

According to embodiments of the present application, the third protective layer is arranged on the first starting segment; wherein in a thickness direction of the second electrode tab, the third protective layer is overlapped with the second protective layer.

According to embodiments of the present application, a battery is further provided comprising an electrode assembly and a package bag; the electrode assembly, comprising a first current collector including a first end portion, a first bending segment, and a first starting segment therebetween; a second current collector including a second end portion, a second bending segment, and a second starting segment therebetween; the first bending segment and the second bending segment are regions where the first current collector and the second current collector are bent for the first time respectively, and a first electrode tab and a second electrode tab are respectively arranged on the first starting segment and the second starting segment, a distance between the first electrode tab and the first end portion is smaller than a distance between the first electrode tab and the first bending segment, and a distance between the second electrode tab and the second end portion is greater than a distance between the second electrode tab and the second bending segment; wherein the package bag covers an outside of the electrode assembly According to embodiments of the present application, a first protective layer and a second protective layer are respectively arranged on the first electrode tab and the second electrode tab; wherein at least one of the first protective layer and the second protective layer has a thickness between 20 microns and 40 microns.

According to embodiments of the present application, the first current collector includes a first uncoated foil region, a surface of the first uncoated foil region is not provided with an active material, and the first starting segment is located on the first uncoated foil region; wherein the surface of the first uncoated foil region is provided with a third protective layer, and in a thickness direction of the first electrode tab, the third protective layer is not overlapped with the first protective layer.

According to embodiments of the present application, wherein the first uncoated foil segment further includes the first bending segment and a first straight segment, and the first bending segment is located between the first straight segment and the first starting segment; wherein in a thickness direction of the first electrode tab, the first starting segment is located between the first straight segment and the second starting segment, and the third protective layer is located on the first straight segment and the third protective layer is overlapped with the second protective layer.

According to embodiments of the present application, the second current collector further includes a second straight segment, the second bending segment is located between the second straight segment and the second starting segment; wherein in a thickness direction of the second electrode tab, the first starting segment is located between the second straight segment and the second starting segment, and the second protective layer is arranged on the second starting segment, the second bending segment and the second straight segment.

According to embodiments of the present application, the second current collector further includes a second straight segment, the second bending segment is located between the second straight segment and the second starting segment; wherein in a thickness direction of the second electrode tab, the first starting segment is located between the second straight segment and the second starting segment, and a fourth protective layer is further arranged on the second bending segment and the second straight segment and the second protective layer are connected with the fourth protective layer.

According to embodiments of the present application, the third protective layer is arranged on the first straight segment and the first starting segment is provided with a fourth protective layer; wherein in a thickness direction of the first electrode tab, the second protective layer, the third protective layer, and the fourth protective layer are overlapped with each other.

According to embodiments of the present application, a third protective layer is arranged on the first starting segment; wherein in a thickness direction of the second electrode tab, the second protective layer is overlapped with the third protective layer.

The beneficial effects of the present application are as follows:

In the electrode assembly and the battery provided by the present application, by arranging the first and second electrode tabs on the first and second starting segments before the first and second bending segments where the first and second current collectors are first bent, and by adjusting a distance between the first and second electrode tabs and their respective ends and bending segments, winding implementability of the internal protection structure may be enhanced to effectively improve the winding process reliability without affecting the performance of impact and nail of the internal protection structure.

LIST OF REFERENCE NUMERALS 10 electrode assembly
12 first current collector
14 second current collector
16 first end portion
18 first bending segment
20 first starting segment
22 second end portion
24 second bending segment
26 second starting segment
28 first electrode tab
30 second electrode tab
32 first protective layer
34 second protective layer
36 third protective layer
38 first straight segment 40 second straight segment
42 fourth protective layer
T thickness direction of first electrode tab
T' thickness direction of second electrode tab

DETAILED DESCRIPTION OF THE PREFERRED EMBODIMENTS

The electrode assembly and the battery of the present application will be described below with reference to the accompanying drawings. It should be understood that the various structures shown in the drawings are merely schematic structures of the present application, and are not intended to limit the present application. Other embodiments that are not shown or described in the drawings and text are contemplated by those skilled in the art through the following drawings and combining the following description.

Figure 1:
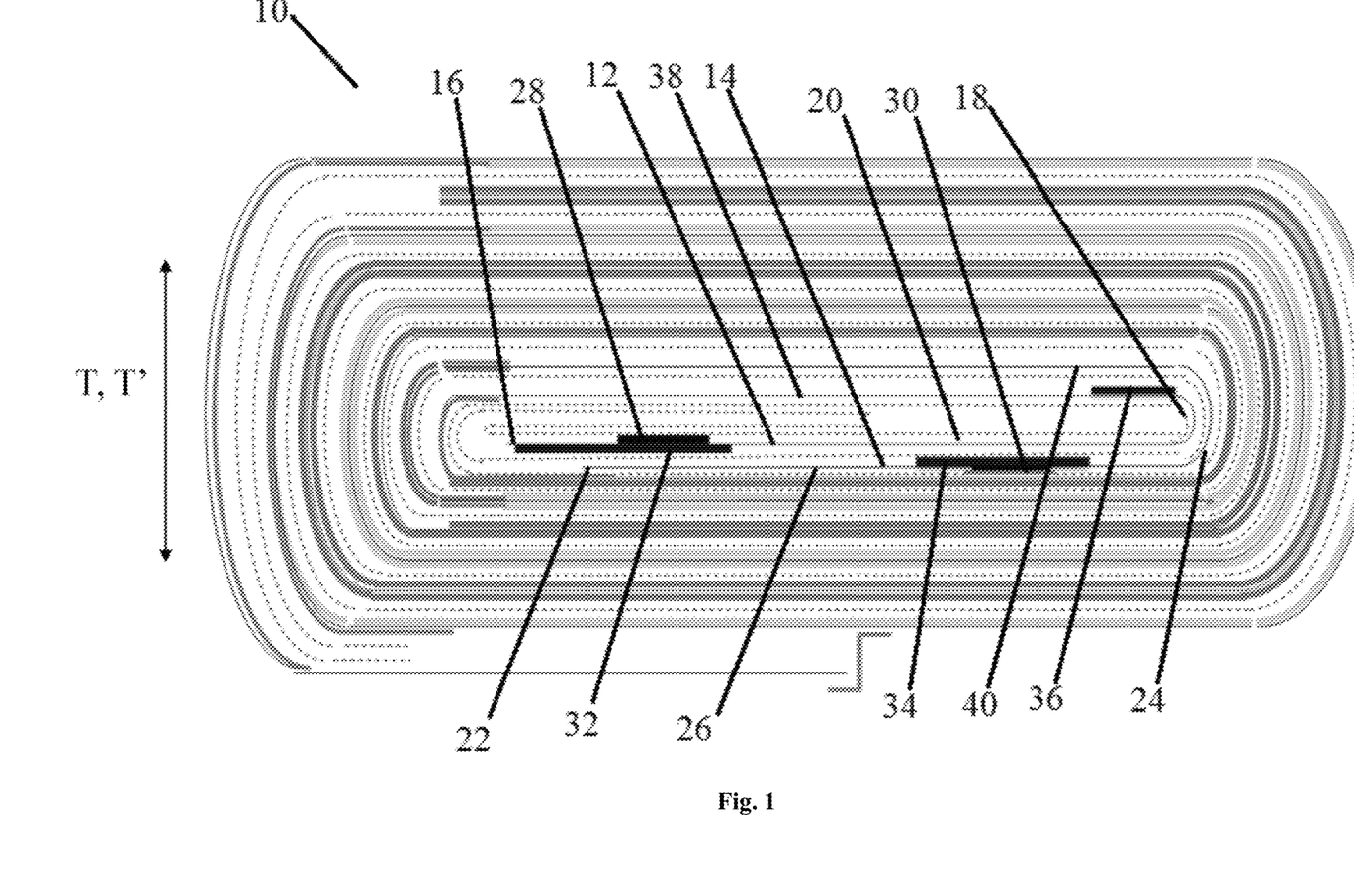
FIG. 1 is a cross-sectional view of an electrode assembly according to an embodiment of the present application.

As shown in FIG. 1, in an embodiment, the present application provides an electrode assembly 10. The electrode assembly 10 generally includes a first current collector 12 and a second current collector 14. Among them, the first current collector 12 includes a first end portion 16, a first bending segment 18, and a first starting segment 20 therebetween; the second current collector 14 includes a second end portion 22, a second bending segment 24, and a second starting segment 26 therebetween.

Specifically, the first bending segment 18 and the second bending segment 24 are regions where the first current collector 12 and the second current collector 14 are bent for the first time respectively, and a first electrode tab 28 and a second electrode tab 30 are respectively arranged on the first starting segment 20 and the second starting segment 26.

Figure 1A:
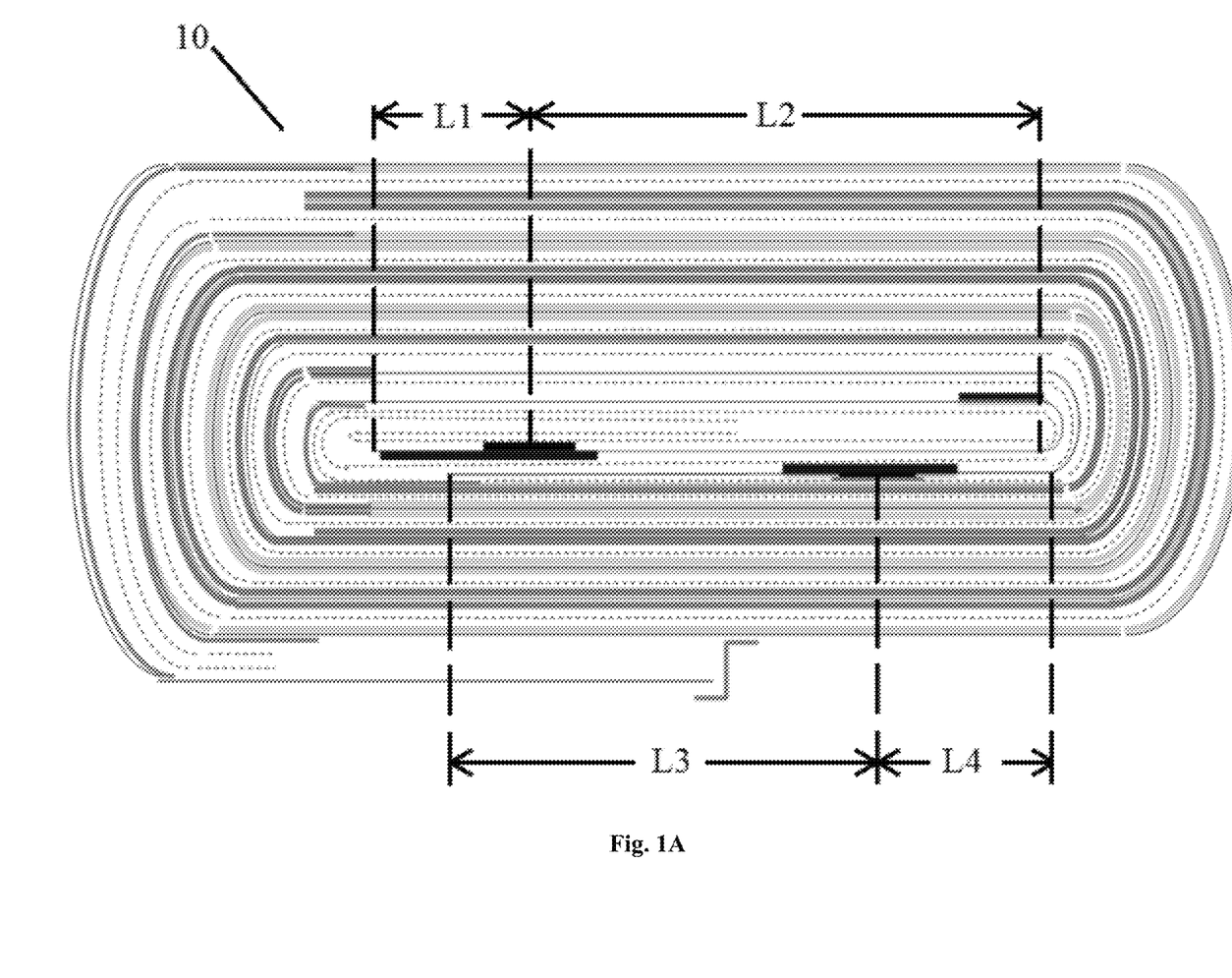
FIG. 1A is a cross-sectional view of the electrode assembly of the embodiment shown in FIG. 1.

In addition, as shown in FIG. 1A, a distance L1 between the first electrode tab 28 and the first end portion 16 is smaller than a distance L2 between the first electrode tab 28 and the first bending segment 18; a distance L3 between the second electrode tab 30 and the second end portion 22 is greater than a distance L4 between the second electrode tab 30 and the second bending segment 24.

According to the above, in the electrode assembly 10 provided by the present application, by arranging the first and second electrode tabs 28, 30 on the first and second starting segments 20, 26 before the first and second bending segments 18, 24 where the first and second current collectors 12, 14 are first bent, and by adjusting the distances between the first and second electrode tabs 28, 30 and their respective ends and bending segments, winding implementability of the internal protection structure may be enhanced to effectively improve the winding process reliability without affecting the performance of impact and nail of the internal protection structure.

Further, as shown in FIG. 1, a first protective layer 32 and a second protective layer 34 are respectively arranged on the first electrode tab 28 and the second electrode tab 30. Among them, at least one of the first protective layer 32 and the second protective layer 34 has a thickness between 20 microns and 40 microns. In other words, the present application replaces the protective layer from the original thin glue into a thick glue to enhance its protective properties.

With continued reference to FIG. 1, in an embodiment of the present application, the first current collector 12 further includes a first uncoated foil region, a surface of the first uncoated foil region is not provided with an active material, and the first starting segment 20 is located on the first uncoated foil region. As shown, the surface of the first uncoated foil region is provided with a third protective layer 36, and in a thickness direction T of the first electrode tab 28, the third protective layer 36 is not overlapped with the first protective layer 32.

As shown in FIG. 1, in an embodiment, the first uncoated foil segment further includes the first bending segment 18 described above and a first straight segment 38, and the first bending segment 18 is located between the first straight segment 38 and the first starting segment 20. As shown, in a thickness direction T of the first electrode tab 28, the first starting segment 20 is located between the first straight segment 38 and the second starting segment 26, and the third protective layer 36 is further located on the first straight segment 38.

Figure 2:
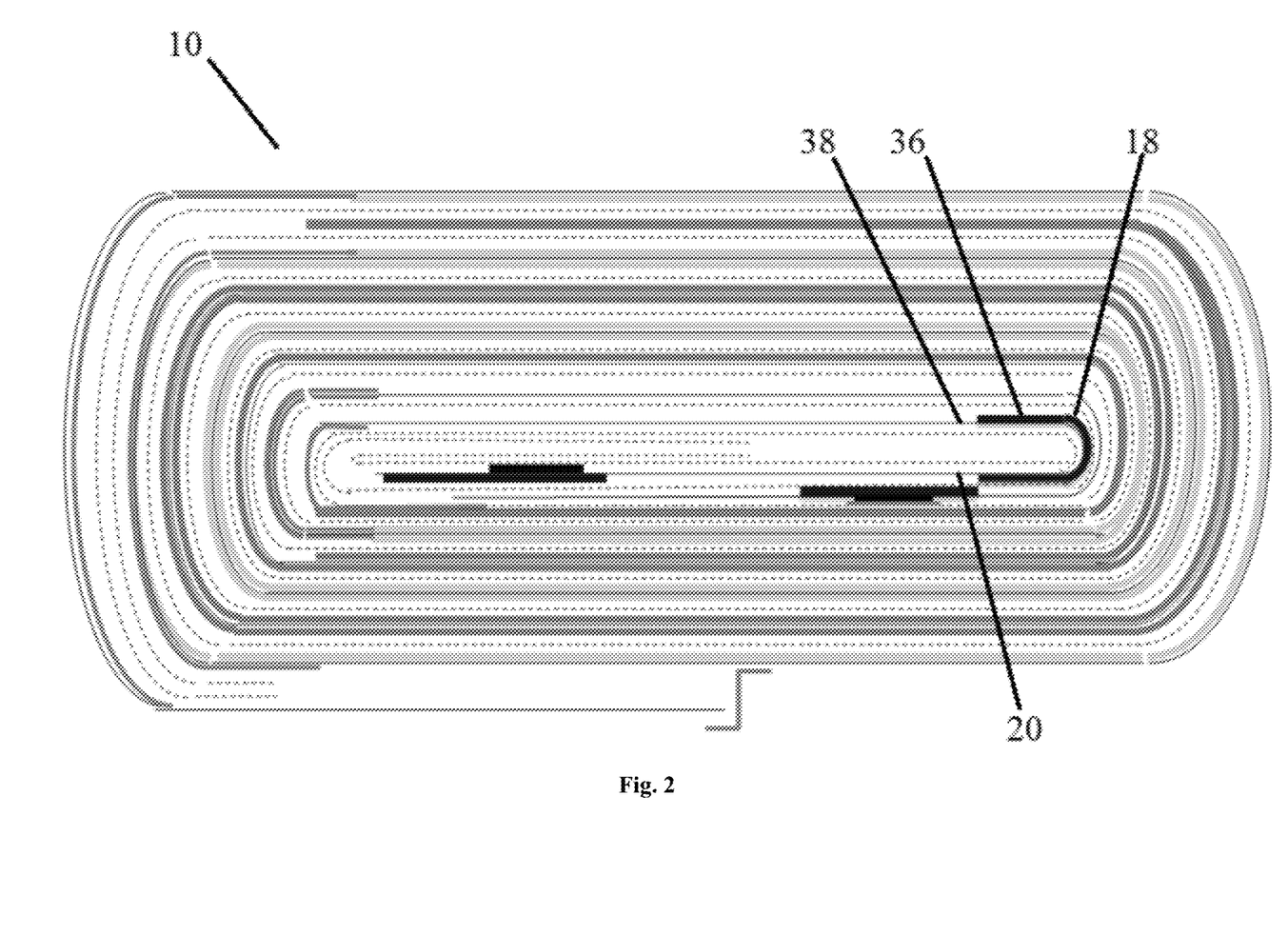
FIG. 2 is a cross-sectional view of an electrode assembly according to an embodiment of the present application.

It is to be understood that the location of above third protective layer 36 is merely an embodiment of the present application. For example, in the embodiment shown in FIG. 2, the third protective layer 36 may be further arranged on the first straight segment 38, the first bending segment 18 and the first starting segment 20. The specific setting position may be determined according to the actual situation of the present application, and the present application is not limited thereto.

Figure 3:
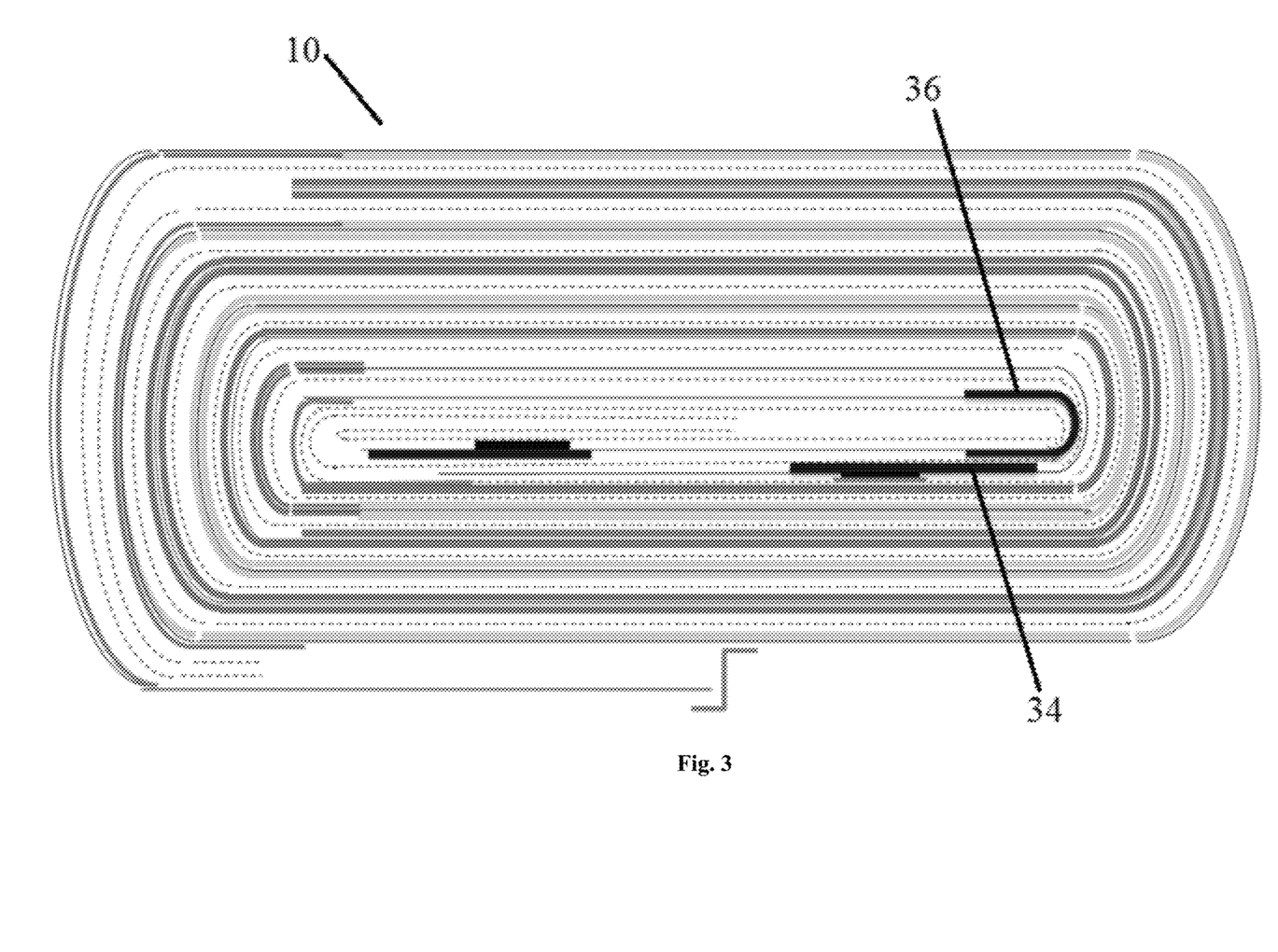
FIG. 3 is a cross-sectional view of an electrode assembly according to an embodiment of the present application.

In an additional embodiment, in a thickness direction T of the first electrode tab 28, the third protective layer 36 may also be overlapped with the second protective layer 34, as shown in FIG. 3.

Figure 4:
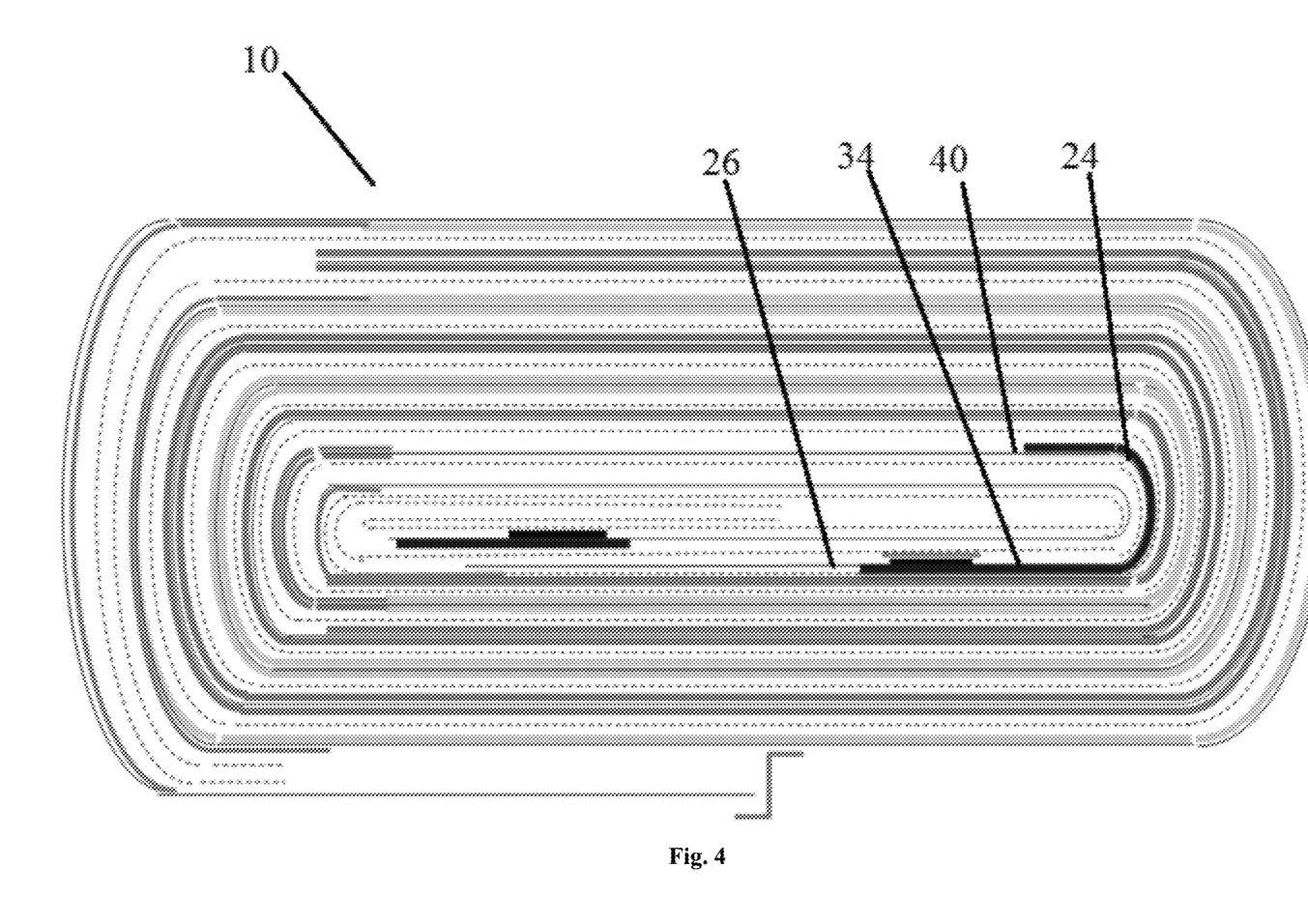
FIG. 4 is a cross-sectional view of an electrode assembly according to an embodiment of the present application.

With further reference to FIG. 4, in an embodiment, the second current collector 14 further includes a second straight segment 40, and the second bending segment 24 may be located between the second straight segment 40 and the second starting segment 26. Specifically, in a thickness direction T' of the second electrode tab 30, the first starting segment 20 may be located between the second straight segment 40 and the second starting segment 26, and the second protective layer 34 is arranged on the second starting segment 26, the second bending segment 24 and the second straight segment 40. Similar to the above description regarding the first current collector 12, the manner in which the protective layer on the second current collector 14 is arranged is also merely illustrative, and the setting location may be determined depending on the specific use case, and the present application is not limited thereto.

Figure 5:
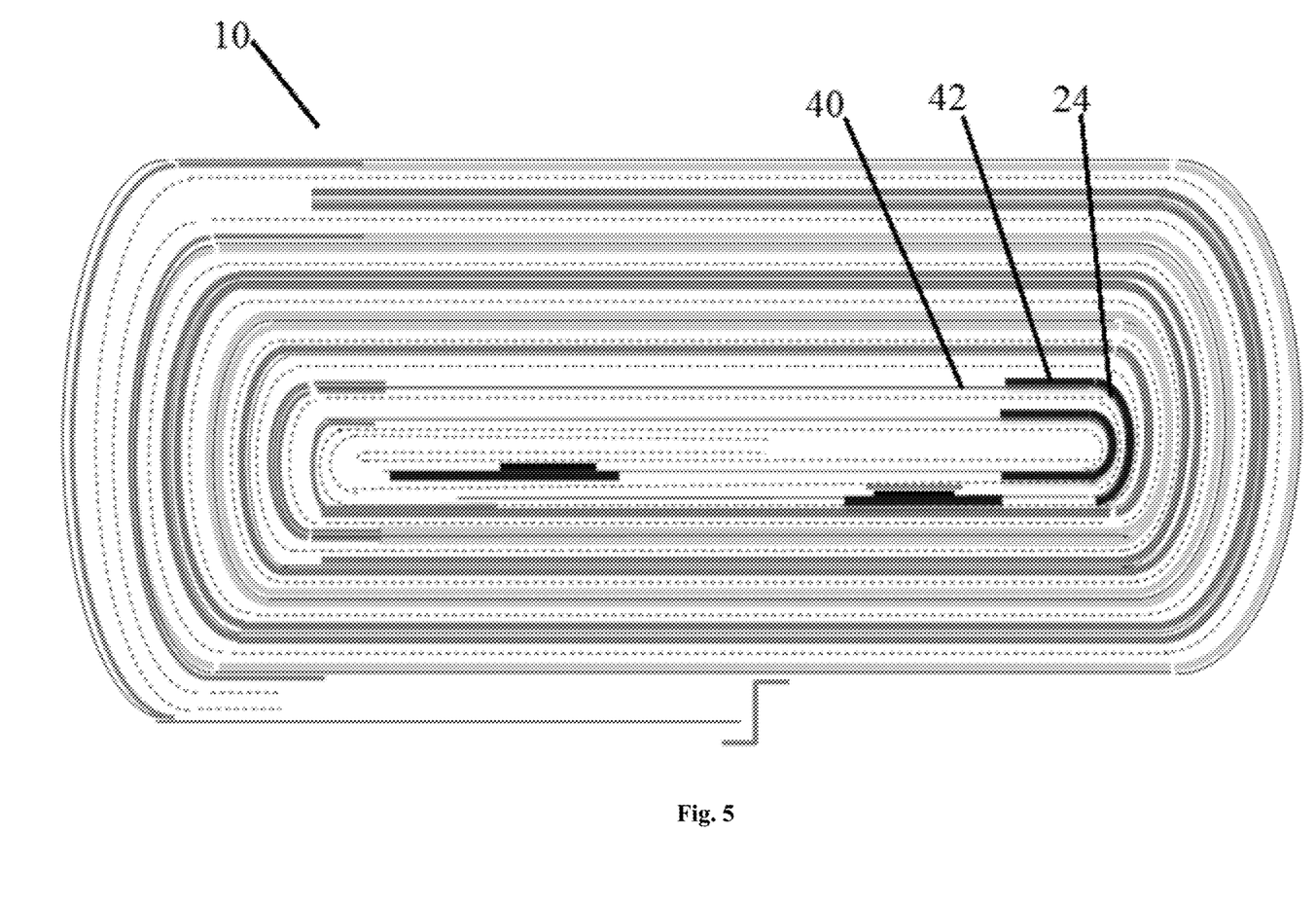
FIG. 5 is a cross-sectional view of an electrode assembly according to an embodiment of the present application.

In another embodiment of the present application, as shown in FIG. 5, in a thickness direction T' of the second electrode tab 30, the first starting segment 20 is located between the second straight segment 40 and the second starting segment 26, and a fourth protective layer 42 is further arranged on the second bending segment 24 and the second straight segment 40.

Figure 6:
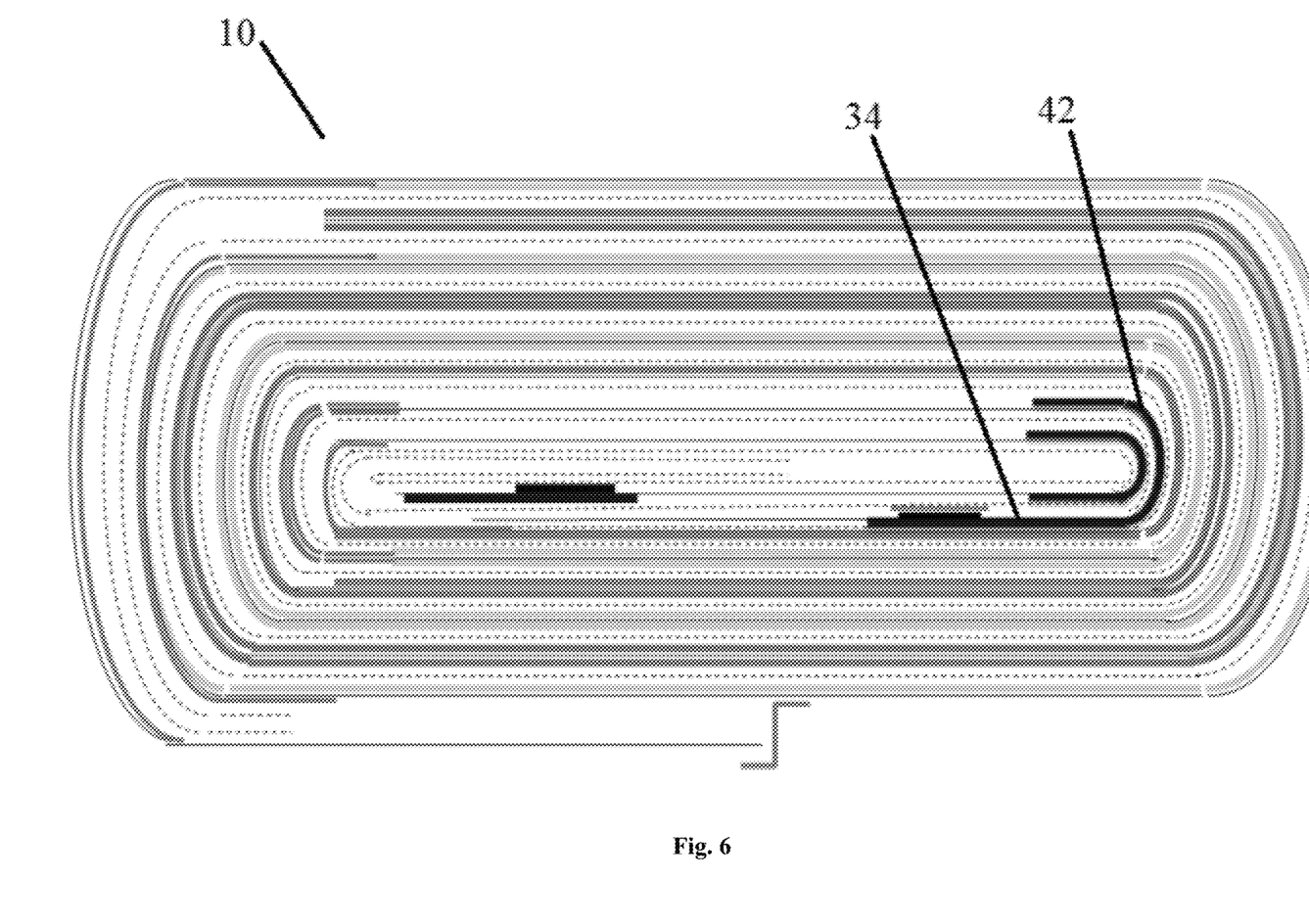
FIG. 6 is a cross-sectional view of an electrode assembly according to an embodiment of the present application.

Optionally, as shown in FIG. 6, the second protective layer 34 may be connected to the fourth protective layer 42, so that a continuous protective layer is formed.

Figure 7:
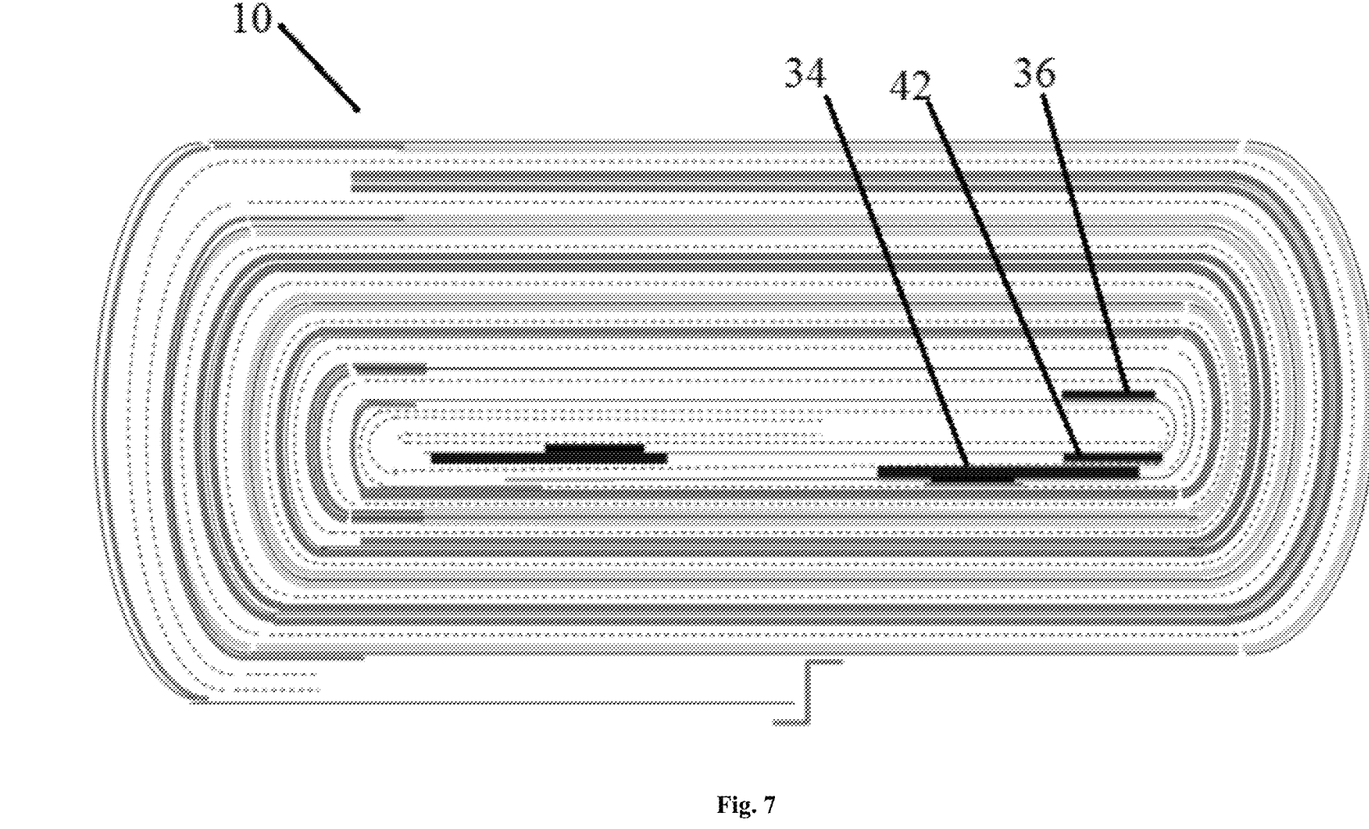
FIG. 7 is a cross-sectional view of an electrode assembly according to an embodiment of the present application.

However, in another embodiment, as shown in FIG. 7, the third protective layer 36 may be arranged on the first straight segment 38, and the fourth protective layer 42 is arranged on the first starting segment 20. In the present embodiment, in a thickness direction T of the first electrode tab 28, the second protective layer 34, the third protective layer 36, and the fourth protective layer 42 are overlapped with each other.

Figure 8:
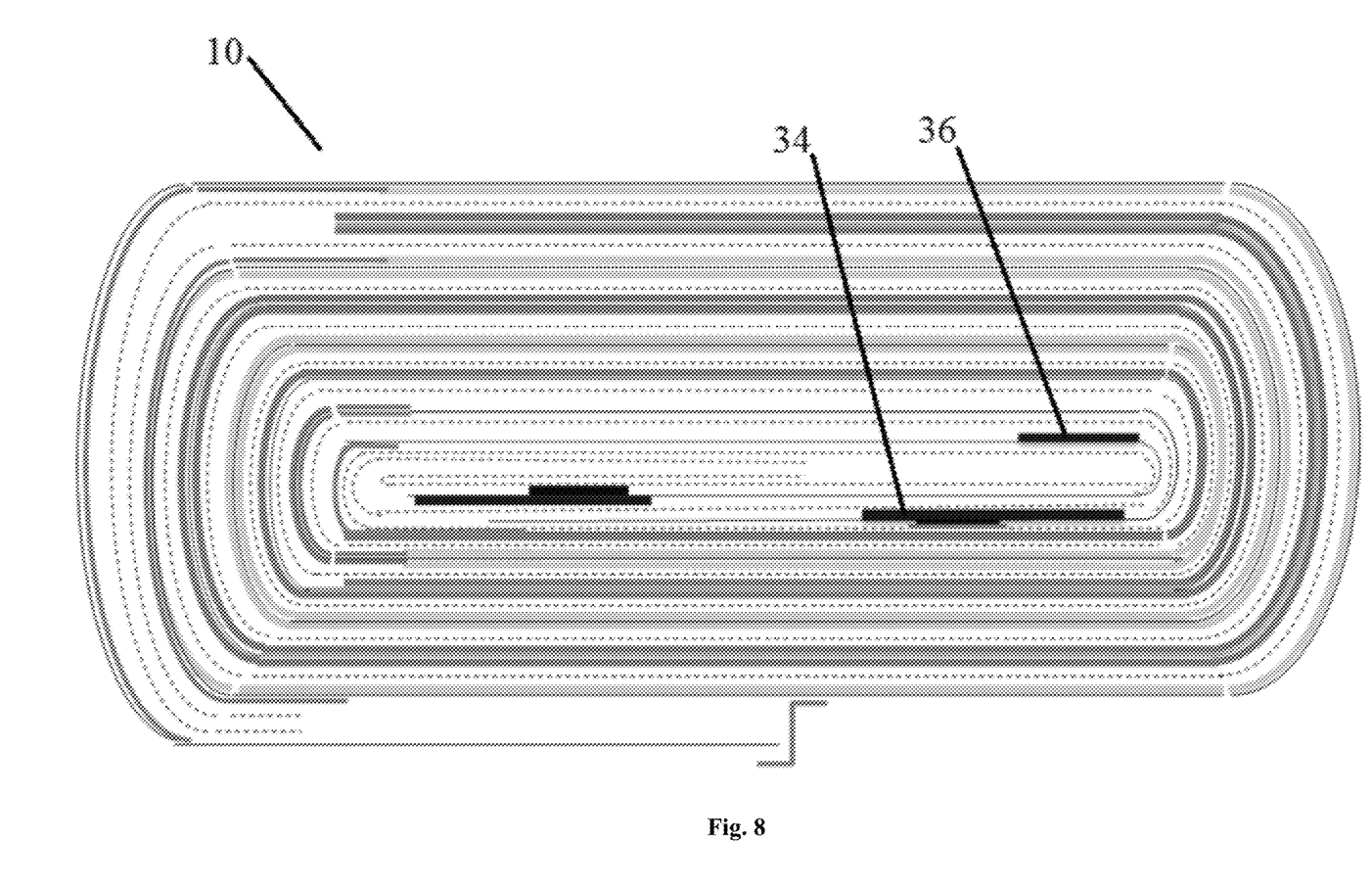
FIG. 8 is a cross-sectional view of an electrode assembly according to an embodiment of the present application.

Optionally, in the embodiment shown in FIG. 8, in a thickness direction T' of the second electrode tab 30, the third protective layer 36 may be overlapped with the second protective layer 34.

Figure 9:
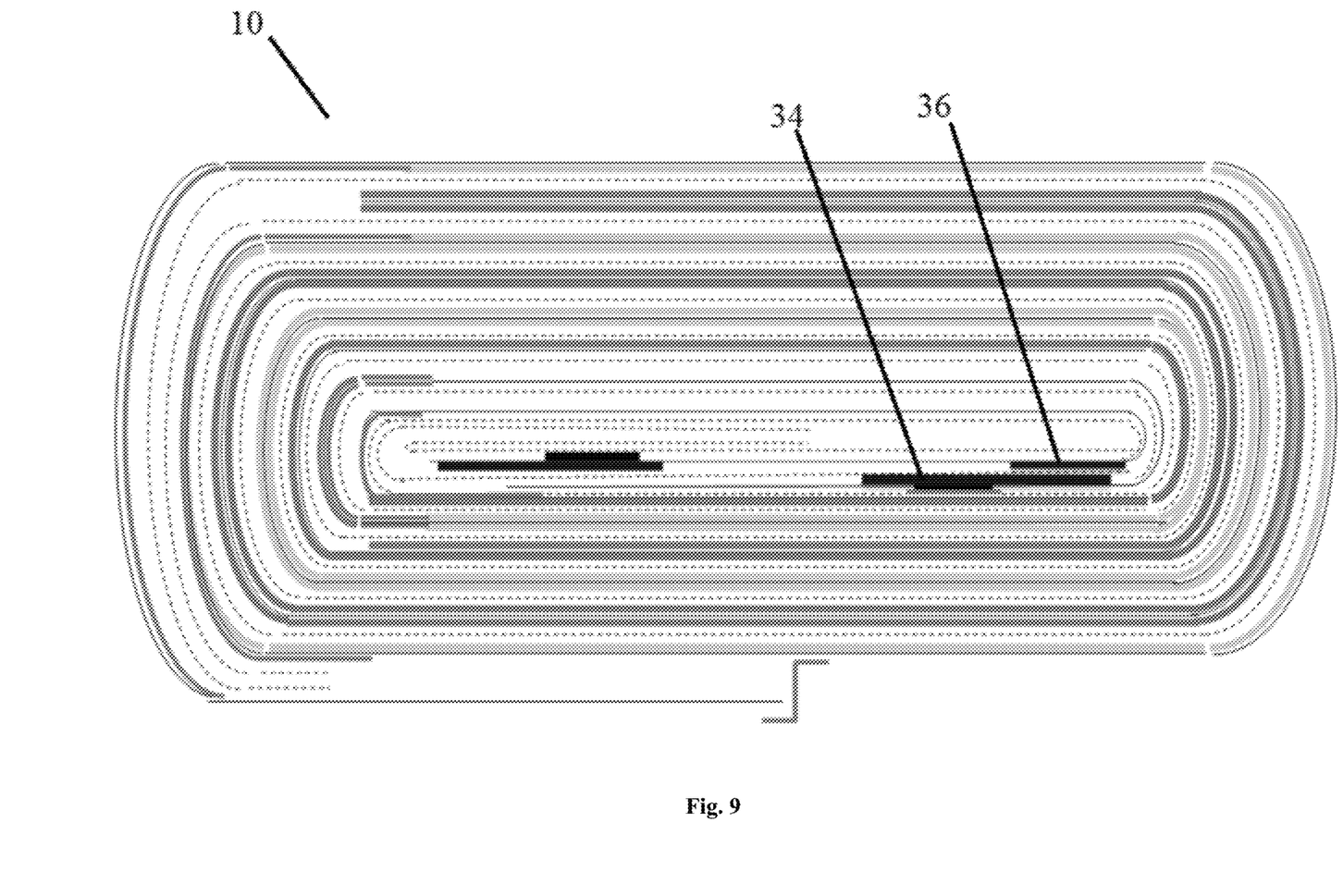
FIG. 9 is a cross-sectional view of an electrode assembly according to an embodiment of the present application.

However, in another embodiment, as shown in FIG. 9, the third protective layer 36 may be arranged on the first starting segment 20. Specifically, in a thickness direction T' of the second electrode tab 30, the second protective layer 34 may be overlapped with the third protective layer 36.

In other words, in the embodiments shown in FIGS. 1 to 9, only some alternative embodiments of the electrode assembly 10 of the present application are illustrated. The embodiments shown in FIGS. 1 to 9 may be combined or replaced with each other to form a further embodiment not shown in the drawings; and other embodiments of the present application that are not shown in the drawings may be considered by those skilled in the art without departing from the scope defined by the present application based on the above description and with reference to the accompanying drawings.

In another aspect, the present application further provides a battery. The battery comprises the electrode assembly 10 described above and a package bag covering outside the electrode assembly 10. Since the electrode assembly 10 as described above is used in the battery, the battery also has the features possessed by the electrode assembly of the present application.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. An electrode assembly, comprising:
   a first current collector including a first end portion, a first bending segment, and a first starting segment therebetween;
   a second current collector including a second end portion, a second bending segment, and a second starting segment therebetween;
   wherein the electrode assembly is formed by the first current collector wound from the inside to the outside starting from the first end portion, and the second current collector wound from the inside to the outside starting from the second end portion, the first bending segment and the second bending segment are regions where the first current collector and the second current collector are bent for the first time respectively, and a first electrode tab and a second electrode tab are respectively arranged on the first starting segment and the second starting segment,
   wherein a distance between the first electrode tab and the first end portion is smaller than a distance between the first electrode tab and the first bending segment, and a distance between the second electrode tab and the second end portion is greater than a distance between the second electrode tab and the second bending segment.

2. The electrode assembly according to claim 1, wherein a first protective layer and a second protective layer are respectively arranged on the first electrode tab and the second electrode tab;
   wherein at least one of the first protective layer and the second protective layer has a thickness between 20 microns and 40 microns.

3. The electrode assembly according to claim 2, wherein the first current collector includes a first uncoated foil region, a surface of the first uncoated foil region is not provided with an active material, and the first starting segment is located on the first uncoated foil region;
   wherein the surface of the first uncoated foil region is provided with a third protective layer, and in a thickness direction of the first electrode tab, the third protective layer is not overlapped with the first protective layer.

4. The electrode assembly according to claim 3, wherein the first uncoated foil segment further includes the first bending segment and a first straight segment, and the first bending segment is located between the first straight segment and the first starting segment;
   wherein in a thickness direction of the first electrode tab, the first starting segment is located between the first straight segment and the second starting segment, and the third protective layer is located on the first straight segment.

5. The electrode assembly according to claim 4, wherein the third protective layer is arranged on the first straight segment, the first bending segment and the first starting segment.

6. The electrode assembly according to claim 5, wherein in a thickness direction of the first electrode tab, the third protective layer is overlapped with the second protective layer.

7. The electrode assembly according to claim 2, wherein the second current collector further includes a second straight segment, the second bending segment is located between the second straight segment and the second starting segment;
   wherein in a thickness direction of the second electrode tab, the first starting segment is located between the second straight segment and the second starting segment, and the second protective layer is arranged on the second starting segment, the second bending segment and the second straight segment.

8. The electrode assembly according to claim 5, wherein the second current collector further includes a second straight segment, the second bending segment is located between the second straight segment and the second starting segment;
   wherein in a thickness direction of the second electrode tab, the first starting segment is located between the second straight segment and the second starting segment, and a fourth protective layer is further arranged on the second bending segment and the second straight segment.

9. The electrode assembly according to claim 8, wherein the second protective layer is connected with the fourth protective layer.

10. The electrode assembly according to claim 4, wherein the third protective layer is arranged on the first straight segment and the first starting segment is provided with a fourth protective layer;
    wherein in a thickness direction of the first electrode tab, the second protective layer, the third protective layer, and the fourth protective layer are overlapped with each other.

11. The electrode assembly according to claim 4, wherein in a thickness direction of the second electrode tab, the third protective layer is overlapped with the second protective layer.

12. The electrode assembly according to claim 2, wherein a third protective layer is arranged on the first starting segment;
    wherein in a thickness direction of the second electrode tab, the second protective layer is overlapped with the third protective layer.

13. A battery, comprising an electrode assembly and a package bag;

the electrode assembly, comprising:

a first current collector including a first end portion, a first bending segment, and a first starting segment therebetween;

a second current collector including a second end portion, a second bending segment, and a second starting segment therebetween;

wherein the electrode assembly is formed by the first current collector wound from the inside to the outside starting from the first end portion, and the second current collector wound from the inside to the outside starting from the second end portion, the first bending segment and the second bending segment are regions where the first current collector and the second current collector are bent for the first time respectively, and a first electrode tab and a second electrode tab are respectively arranged on the first starting segment and the second starting segment, a distance between the first electrode tab and the first end portion is smaller than a distance between the first electrode tab and the first bending segment, and a distance between the second electrode tab and the second end portion is greater than a distance between the second electrode tab and the second bending segment;

wherein the package bag covers an outside of the electrode assembly.

14. A battery according to claim 13, a first protective layer and a second protective layer are respectively arranged on the first electrode tab and the second electrode tab;

wherein at least one of the first protective layer and the second protective layer has a thickness between 20 microns and 40 microns.

15. The electrode assembly according to claim 14, the first current collector includes a first uncoated foil region, a surface of the first uncoated foil region is not provided with an active material, and the first starting segment is located on the first uncoated foil region;

wherein the surface of the first uncoated foil region is provided with a third protective layer, and in a thickness direction of the first electrode tab, the third protective layer is not overlapped with the first protective layer.

16. The electrode assembly according to claim 15, wherein the first uncoated foil segment further includes the first bending segment and a first straight segment, and the first bending segment is located between the first straight segment and the first starting segment;

wherein in a thickness direction of the first electrode tab, the first starting segment is located between the first straight segment and the second starting segment, and the third protective layer is located on the first straight segment and the third protective layer is overlapped with the second protective layer.

17. The electrode assembly according to claim 14, the second current collector further includes a second straight segment, the second bending segment is located between the second straight segment and the second starting segment;

wherein in a thickness direction of the second electrode tab, the first starting segment is located between the second straight segment and the second starting segment, and the second protective layer is arranged on the second starting segment, the second bending segment and the second straight segment.

18. The electrode assembly according to claim 16, the second current collector further includes a second straight segment, the second bending segment is located between the second straight segment and the second starting segment;

wherein in a thickness direction of the second electrode tab, the first starting segment is located between the second straight segment and the second starting segment, and a fourth protective layer is further arranged on the second bending segment and the second straight segment and the second protective layer are connected with the fourth protective layer.

19. The electrode assembly according to claim 16, the third protective layer is arranged on the first straight segment and the first starting segment is provided with a fourth protective layer;

wherein in a thickness direction of the first electrode tab, the second protective layer, the third protective layer, and the fourth protective layer are overlapped with each other.

20. The electrode assembly according to claim 14, a third protective layer is arranged on the first starting segment;

wherein in a thickness direction of the second electrode tab, the second protective layer is overlapped with the third protective layer.

* * * * *